United States Patent
Yamada

(10) Patent No.: US 11,837,196 B2
(45) Date of Patent: Dec. 5, 2023

(54) IMAGE DISPLAY METHOD, IMAGE DISPLAY APPARATUS, AND STORAGE MEDIUM STORING DISPLAY CONTROL PROGRAM

(71) Applicant: Seiko Epson Corporation, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 5 days.

(21) Appl. No.: 17/387,689

(22) Filed: Jul. 28, 2021

(65) Prior Publication Data

US 2022/0036862 A1 Feb. 3, 2022

(30) Foreign Application Priority Data

Jul. 31, 2020 (JP) ................. 2020-130907

(51) Int. Cl.
| | | |
|---|---|---|
| *G09G 5/373* | (2006.01) | |
| *G06T 3/60* | (2006.01) | |
| *G06T 3/40* | (2006.01) | |
| *G06T 13/00* | (2011.01) | |
| *G09G 5/36* | (2006.01) | |
| *G06T 15/10* | (2011.01) | |
| *G06F 3/041* | (2006.01) | |

(52) U.S. Cl.
CPC .............. *G09G 5/373* (2013.01); *G06T 3/40* (2013.01); *G06T 3/60* (2013.01); *G06T 13/00* (2013.01); *G06T 15/10* (2013.01); *G09G 5/363* (2013.01); *G06F 3/041* (2013.01); *G06T 2200/24* (2013.01); *G09G 2354/00* (2013.01)

(58) Field of Classification Search
CPC ........... G06T 3/60; G06T 13/00; G06T 15/10; G06T 2200/24; G06T 2219/2016; G06T 19/20; G09G 5/363; G09G 2354/00; G06F 3/041; G06F 3/04845
See application file for complete search history.

(56) References Cited

U.S. PATENT DOCUMENTS

| | | | | |
|---|---|---|---|---|
| 8,400,449 | B1 * | 3/2013 | Davidson | ................ G06T 19/20 |
| | | | | 715/848 |
| 10,901,579 | B2 | 1/2021 | Yamada | |
| 2012/0287165 | A1 * | 11/2012 | Yamada | .................. G06F 3/147 |
| | | | | 345/672 |
| 2016/0026363 | A1 * | 1/2016 | Little | .................. G06F 3/04815 |
| | | | | 345/419 |
| 2019/0313078 | A1 * | 10/2019 | Reiss | ..................... G06T 19/20 |
| 2020/0210033 | A1 | 7/2020 | Yamada | |

FOREIGN PATENT DOCUMENTS

| | | |
|---|---|---|
| CN | 111381740 | 7/2020 |
| JP | 2011-221586 | 11/2011 |
| JP | 2012-238223 | 12/2012 |
| JP | P6481063 | 2/2019 |
| JP | 2019-159571 | 9/2019 |

\* cited by examiner

*Primary Examiner* — Yi Wang
(74) *Attorney, Agent, or Firm* — WORKMAN NYDEGGER

(57) ABSTRACT

An image display method includes: displaying a first image having a first image surface on a display surface in a three-dimensional fashion; in response to a reception of an instruction of rotating the first image around an axis different from any axis in the display surface, rotating the first image around a first imaginary axis, the first imaginary axis being vertical to the first image surface and different from an axis vertical to the display surface; and displaying the rotated first image.

14 Claims, 11 Drawing Sheets

IMAGE DISPLAY METHOD, IMAGE DISPLAY APPARATUS, AND STORAGE MEDIUM STORING DISPLAY CONTROL PROGRAM

The present application is based on, and claims priority from JP Application Serial Number 2020-130907, filed Jul. 31, 2020, the disclosure of which is hereby incorporated by reference herein in its entirety.

BACKGROUND

1. Technical Field

The present disclosure relates to an image display method, an image display apparatus, and a storage medium that stores a display control program.

2. Related Art

Mobile terminal devices, such as notebook computers, portable computers, and smartphones, can display a plurality of images on their screens at the same time.

JP-A-2019-159571 discloses a technique about an information display program which can rotate a three-dimensional (3D) object image displayed on a display surface.

The disclosed technique clearly displays the rotation of a 3D object image around an axis in a display surface, whereas it may distort a 3D object image, especially when rotating it around an axis vertical to a display surface.

SUMMARY

According to a first aspect of the present disclosure, an image display method includes: displaying a first image having a first image surface on a display surface in a three-dimensional fashion; in response to a reception of an instruction of rotating the first image around an axis different from any axis in the display surface, rotating the first image around a first imaginary axis, the first imaginary axis being vertical to the first image surface and different from an axis vertical to the display surface; and displaying the rotated first image.

According to a second aspect of the present disclosure, an image display apparatus that includes: a display unit having a display surface; a display controller that displays a first image having a first image surface on the display surface in a three-dimensional fashion; and an input unit that receives an instruction of rotating the first image around an axis different from any axis in the display surface. In response to a reception of the instruction from the input unit, the display controller rotates the first image around a first imaginary axis and displays the rotated first image, the first imaginary axis being vertical to the first image surface and different from an axis vertical to the display surface.

According to a third aspect of the present disclosure, a non-transitory computer-readable storage medium that stores a display control program. The display control program causes a computer to perform a method that includes: displaying a first image having a first image surface on a display surface in a three-dimensional fashion; in response to a reception of an instruction of rotating the first image around an axis different from any axis in the display surface, rotating the first image around a first imaginary axis, the first imaginary axis being vertical to the first image surface and different from an axis vertical to the display surface; and displaying the rotated first image.

DESCRIPTION OF EXEMPLARY EMBODIMENTS

Some embodiments of the present disclosure will be described below with reference to the accompanying drawings.

Figure 1:
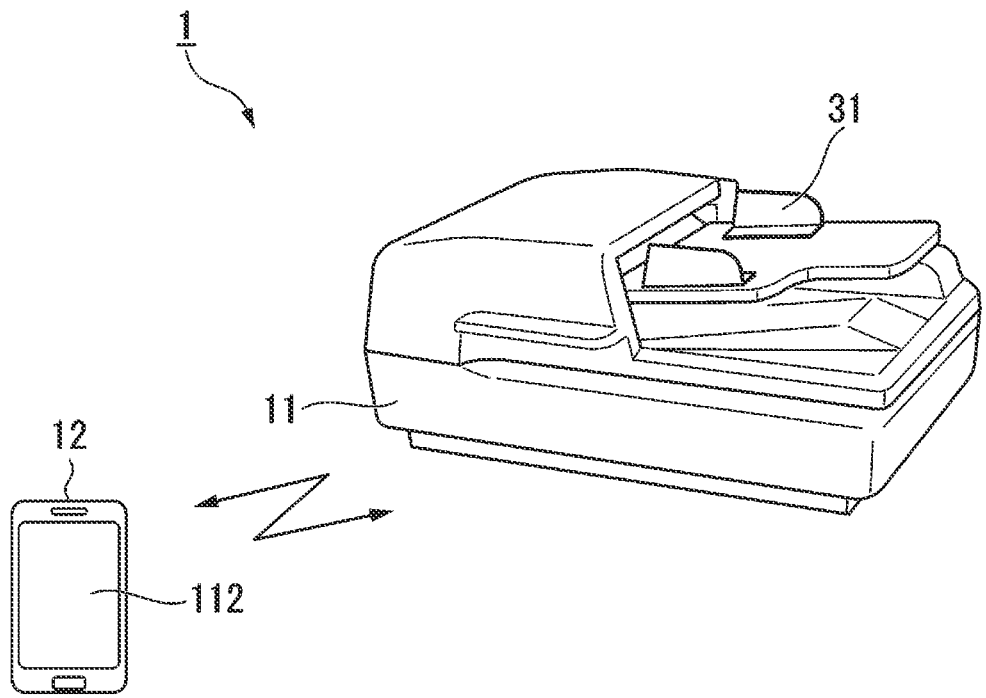
FIG. 1 schematically illustrates an information processing system according to an embodiment of the present disclosure.

FIG. 1 schematically illustrates an information processing system 1 according to an embodiment of the present disclosure. The information processing system 1 includes an image processing apparatus 11 and a mobile terminal device 12, both of which can wirelessly communicate with each other.

The mobile terminal device 12, which may be a portable terminal device or a smartphone, can be carried and operated by a user. The mobile terminal device 12 has a display unit 112 with a touchscreen that allows the user to perform touch operations. The terminal device 12 displays various information on the screen of the display unit 112 in response to a user's operation. The mobile terminal device 12 can wirelessly communicate with the image processing apparatus 11, thereby controlling an image process performed by the image processing apparatus 11.

The image processing apparatus 11 operates mainly in response to an instruction from the mobile terminal device 12 and performs the image process in accordance with this instruction. The image processing apparatus 11 performs a scanner function to read a plurality of images and then wirelessly transmits data on the read images to the mobile terminal device 12. The image processing apparatus 11 has an automatic document feeder (ADF) 31 and reads a plurality of images from respective paper sheets that have been placed on the ADF 31 and automatically fed thereby. In this case, the paper sheets may be any number of (e.g., 100) A4- or A3-sized documents.

When the mobile terminal device 12 receives the image data from the image processing apparatus 11, the display unit 112 displays the images based on the image data. Then, when receiving a user's instruction based on his/her operation on an image displayed in the display unit 112, the mobile terminal device 12 performs a predetermined process in accordance with this instruction. In addition, the mobile terminal device 12 displays a list of images to be processed by the image processing apparatus 11 through the display unit 112, thus allowing the user to confirm and edit those images.

Figure 2:
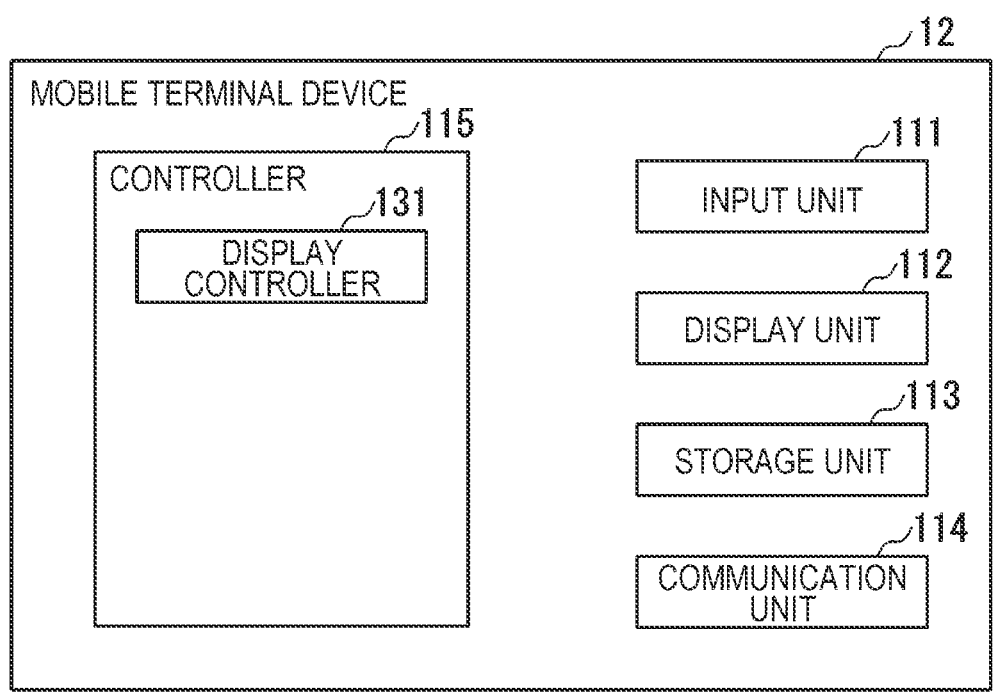
FIG. 2 is a functional block diagram of the mobile terminal device.

FIG. 2 is a functional block diagram of the mobile terminal device 12. The mobile terminal device 12 includes, in addition to the display unit 112, an input unit 111, a storage unit 113, a communication unit 114, and a controller 115 having a display controller 131. Both of the input unit 111 and the display unit 112 may be implemented by a single touchscreen.

In the mobile terminal device 12, the input unit 111 receives a user's operation through the touchscreen. More specifically, the input unit 111 detects the contact and movement of a user's finger or pen on the touchscreen, thereby receiving an instruction based on the detection result. The display unit 112 displays various information on the screen. The storage unit 113 may be a memory that stores various information, such as data on an original image to be displayed and its relevant image(s). The storage unit 113 may include read-only memory (ROM) and random access memory (RAM). The communication unit 114 wirelessly communicates with the image processing apparatus 11. The communication unit 114 may be called a communication circuit, a communication port, or a communication interface.

The controller 115 has a central processing unit (CPU) and performs various control processes. The controller 115 is provided with the display controller 131 that controls a process of displaying various information in the display unit 112.

The controller 115 causes the CPU to execute control programs stored in the storage unit 113, thereby performing various control processes; the control programs include a display control program. The controller 115 causes the CPU to execute the display control program stored in the storage unit 113, thereby realizing functions of the display controller 131. This display control program may be an application program dedicated to the image processing apparatus 11. The mobile terminal device 12 may store the display control program in the storage unit 113 in advance or may download the display control program and install it in the storage unit 113.

In the mobile terminal device 12, the functions of the display controller 131 are realized by the controller 115; however, they may be realized by a dedicated functional unit that is disposed independently of the controller 115.

Next, the display control performed by the mobile terminal device 12 will be described below. The display controller 131 receives data on a plurality of original images from the image processing apparatus 11 through the communication unit 114 and then acquires the original images from the received data. In this case, the original images are uniquely given sequential page numbers according to their arrangement. In this case, those page numbers may be given to the original images by either the mobile terminal device 12 or the image processing apparatus 11.

The display controller 131 sets a 3D coordinate system, called a local coordinate system, for the original images. In this case, the local coordinate system may be a 3D orthogonal coordinate system.

Figure 3:
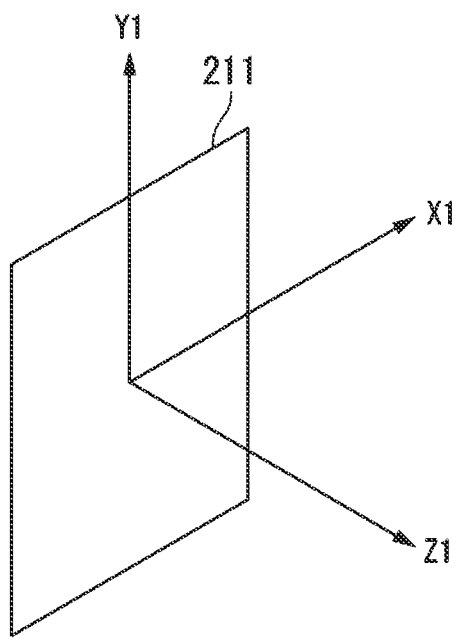
FIG. 3 illustrates an example of a local coordinate system set for a single image.

FIG. 3 illustrates an example of the local coordinate system having an X1-, Y1-, and Z1-axes according to this embodiment which the display controller 131 has set for an image 211. A plurality of local coordinate systems are set for respective images. In this case, the local coordinate systems may be set differently for the images.

The display controller 131 adjusts the positions of the images relative to the local coordinate systems. The display controller 131 positions the images in a common 3D coordinate system, which is a 3D orthogonal coordinate system, called a global coordinate system.

The display controller 131 maps a global image containing the images positioned in the global coordinate system, in a two-dimensional (2D) coordinate system and then handles the mapped result as display data. In this case, the display data may be pixel data; images created based on the display data may be referred to as the thumbnails; the 2D coordinate system may be referred to as the display coordinate system, which is a 2D orthogonal coordinate system; and the display area for the display data may be called the viewport. Although a plurality of images are arranged in the global coordinate system in this embodiment, only one image may be disposed therein. A thumbnail may be a shrunk 3D original image positioned in the 2D coordinate system.

Figure 4:
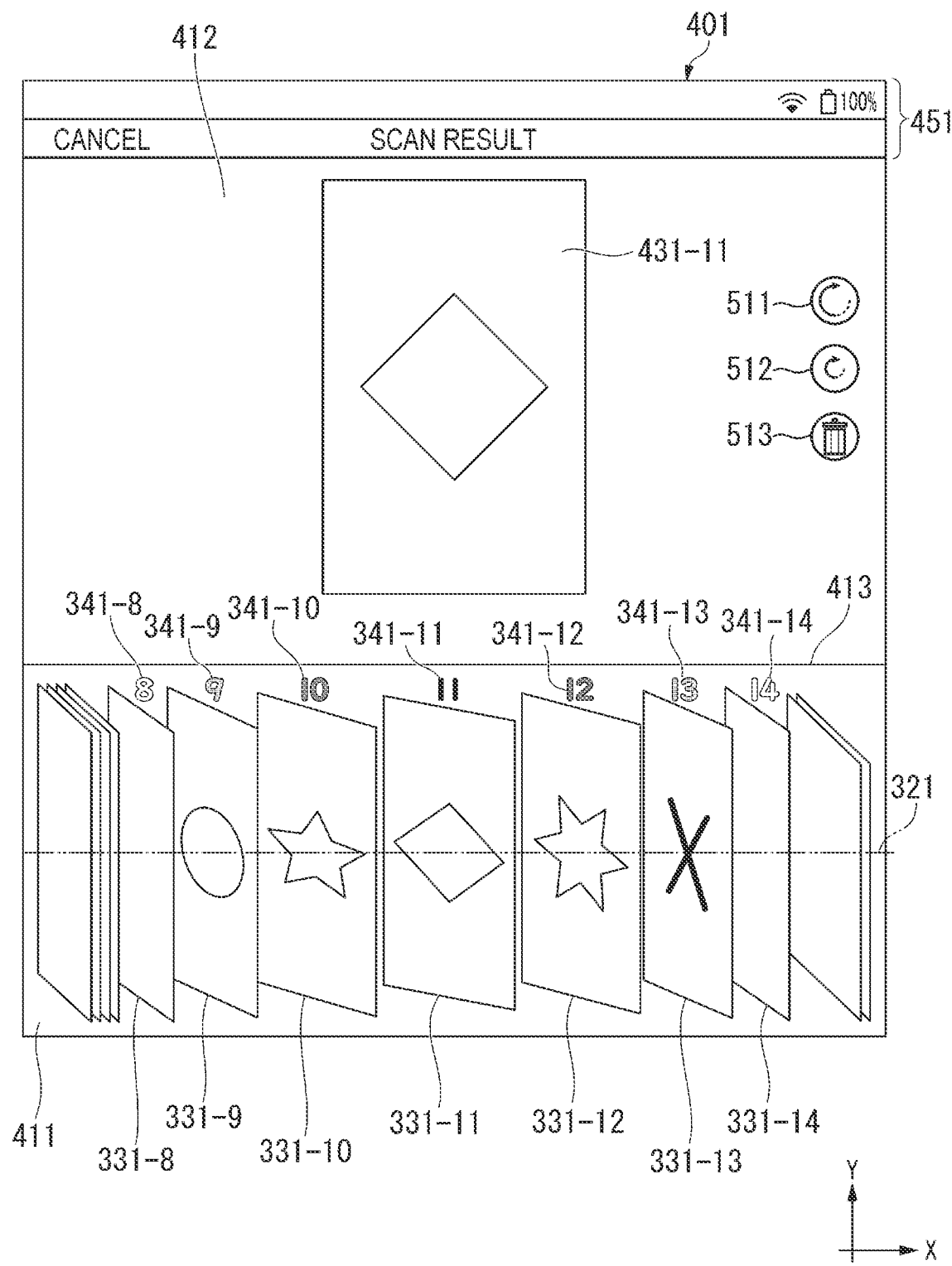
FIG. 4 illustrates an example of a first display image.

FIG. 4 illustrates a first display image 401 in the display coordinate system having an X- and Y-axes according to this embodiment. When the screen of the display unit 112 in the mobile terminal device 12 is viewed from the front, the right side corresponds to the positive side of the X-axis, whereas the left side corresponds to the negative side of the X-axis. Likewise, the upper side corresponds to the positive side of the Y-axis, whereas the lower side corresponds to the negative side of the Y-axis. The orientation of this display coordinate system may be arbitrarily set on the screen.

The first display image 401 is an example of an image displayed in the display unit 112 of the mobile terminal device 12. The first display image 401 contains three display areas: a first display area 411, a second display area 412, and a third display area 451. Except for the third display area 451, the display area of the first display image 401 is divided into the first display area 411 and the second display area 412.

The display controller 131 displays, within the third display area 451, the intensity of a signal received over the wireless communication and letter information such as "CANCEL" to be operated by the user. It should be noted that, however, the display controller 131 does not necessarily have to display the third display area 451.

Each of the first display area 411 and the second display area 412 is a rectangular region with two opposite sides extending in parallel to the X-axis and the remaining sides extending in parallel to the Y-axis. In FIG. 4, each of the first display area 411 and the second display area 412 is formed such that the opposite sides parallel to the X-axis are longer than those parallel to the Y-axis; however, each of the first display area 411 and the second display area 412 may be formed in a different fashion. Moreover, the first display area 411 is disposed on the negative side of the Y-axis, whereas the second display area 412 is disposed on the positive side of the Y-axis, with both the sizes along the X-axis being substantially the same as each other. The +Y-side of the first display area 411 coincides with the −Y-side of the second display area 412 so that they constitute a single rectangular display region. As illustrated in FIG. 4, the first display image 401 optionally contains a boundary axis 413 on the border between the first display area 411 and the second display area 412.

As illustrated in FIG. 4, a plurality of thumbnails, including thumbnails 331-8 to 331-14, are arranged side by side along a first axis 321 within the first display area 411. In the first display area 411, the thumbnails 331-8 to 331-14 are arranged from the negative side to the positive side of the X-axis in increasing order of their page numbers. The first axis 321 is an imaginary axis that is not present within the first display area 411; however, the first axis 321 may be actually present in an alternative configuration example. As illustrated in FIG. 4, the first axis 321 extends in the center of the first display area 411 in parallel to the X-axis.

The plurality of thumbnails 331-8 to 331-14 illustrated in FIG. 4 are also indicated as i-th thumbnails 331-$i$ arranged in increasing order of their page numbers, where i (8 to 13 in FIG. 4) is any integer ranging from one to P (i.e., P denotes the number of thumbnails 331). As illustrated in FIG. 4, each i-th thumbnail 331-$i$ is a rectangular image disposed such that the size along the Y-axis is greater than that along the X-axis. Alternatively, each i-th thumbnail 331-$i$ may be disposed in any orientation, or its orientation may be changed as appropriate.

When the i-th thumbnail 331-$i$ positioned in the center of the first display area 411 on the X-axis is designated as a k-th thumbnail 331-$k$ having a k-th page, the display controller 131 displays the k-th thumbnail 331-$k$ with its image surface forming a predetermined angle with the display surface of the display unit 112. On the other hand, when an i-th thumbnail 331-$i$ that is positioned farther from the center of the first display area 411 than the k-th thumbnail 331-$k$ is designated as a (k+m)-th thumbnail 331-$(k+m)$, the display controller 131 displays the (k+m)-th thumbnail 331-$(k+m)$ with its image surface forming an angle larger than the predetermined angle with the display surface of the display unit 112. Here, k is an integer ranging from 1 to P, and m is an integer smaller than k. The image surface corresponds to the surface of the i-th thumbnail 331-$i$ displayed within the first display area 411. The angle between the image surface of an i-th thumbnail 331-$i$ and the display surface is equivalent to the angle between the Z1-axis of the local coordinate system set for the i-th thumbnail 331-$i$ and the axis vertical to the display surface. Near both the sides of the first display area 411 which are farthest from the center are thumbnails arranged at substantially regular intervals along the first axis 321; these farthest sides correspond to the right and left sides of the first display area 411.

The display controller 131 displays the plurality of thumbnails 331-8 to 331-14 together with images of their page numbers. As illustrated in FIG. 4, for example, the display controller 131 displays an i-th thumbnail 331-$i$ together with an i-th page number image 341-$i$; the i-th page number indicates its page number.

The example in FIG. 4 corresponds to a case where the display controller 131 displays the plurality of thumbnails 331-8 to 331-14 within the first display area 411. In the center of the first display area 411 on the X-axis and the first axis 321, as illustrated in FIG. 4, the thumbnail and page number images for the eleventh page, more specifically, the 11th thumbnail 331-11 and the 11th page number image 341-11 are positioned. Furthermore, within the right region of the first display area 411 on the X-axis, a plurality of thumbnail and page number images for page number greater than 11, including the 12th thumbnail 331-12 and the 12th page number image 341-12, are arranged in increasing order of their page numbers. Likewise, within the left region of the first display area 411 on the X-axis, a plurality of thumbnail and page number images for page numbers less than 11, including the 10th thumbnail 331-10 and the 10th page number image 341-10, are arranged in decreasing order of their page numbers.

The display controller 131 adjusts the locations of i-th page number images 341-$i$ relative to their relevant i-th thumbnails 331-$i$ in the respective local coordinate systems. In this way, the display controller 131 generates display data on the display coordinate system which contains the i-th thumbnail 331-$i$ and the i-th page number image 341-$i$.

The display controller 131 displays i-th page number images 341-$i$ on the +Y-side of their relevant i-th thumbnails 331-$i$. Furthermore, the display controller 131 displays the i-th page number images 341-$i$ within the first display area 411. In other words, the display controller 131 displays the i-th page number images 341-$i$ below the boundary axis 413 extending in parallel to the X-axis as illustrated in FIG. 4; the boundary axis 413 corresponds to the +Y-side border of the first display area 411. However, as an alternative example, the display controller 131 may display some or all of the i-th page number images 341-$i$ above the first display area 411.

The display controller 131 individually adjusts the densities of the i-th page number images 341-$i$ displayed. For this purpose, the display controller 131 may adjust the transparency of each i-th page number image 341-$i$. More specifically, the display controller 131 may increase the density by decreasing the transparency and may decrease the density by increasing the transparency. The display controller 131 may change the shapes, sizes, orientations, densities, locations, and/or colors of the i-th page number images 341-$i$, depending on the display states of the relevant i-th thumbnails 331-$i$.

The display controller 131 displays the i-th page number images 341-$i$ on the +Y-side of the relevant i-th thumbnails 331-$i$ as illustrated in FIG. 4; however, the display controller 131 may display the i-th page number images 341-$i$ on the −Y-side, +X-side, or −X-side of the relevant i-th thumbnails 331-$i$. Moreover, the display controller 131 displays the i-th page number images 341-$i$ outside their relevant i-th thumbnails 331-$i$ as illustrated in FIG. 4; however, the display controller 131 may display the i-th page number images 341-$i$ inside the relevant i-th thumbnails 331-$i$.

In the example of FIG. 4, the original images for the plurality of thumbnails, including the thumbnails 331-8 to 331-14, displayed within the first display area 411 having the same size. However, those original images may have different sizes. The display controller 131 may display a plurality of thumbnails, the sizes of which are proportional to those of their original images. Alternatively, the display controller 131 may perform a process of evening out the sizes of all thumbnails along one or both of the X- and Y-axes.

As illustrated in FIG. 4, the first axis 321 linearly extends; however, the first axis 321 may be curved. The first axis 321 may be curved toward the +Y-side within the region from the center to the right side of the first display area 411 on the X-axis and also within the region from the center to the left side of the first display area 411 on the X-axis. Alternatively, the first axis 321 may be curved such that their segments on the +X- and −X-sides are symmetric to each other with respect to the origin.

The display controller 131 displays an image within the second display area 412; this image is referred to below as the intermediate image and related to an i-th thumbnail 331-$i$, which is any one of a plurality of thumbnails arranged side by side within the first display area 411. As illustrated in FIG. 4, the display controller 131 displays, as the intermediate image, an 11-th intermediate image 431-11 related to the 11th thumbnail 331-11 within the second display area 412. An intermediate image refers to a 2D enlarged image that is created based on its original image and larger than its relevant thumbnail. This 2D image is displayed in the 2D coordinate system. An i-th intermediate image 431-*i* is larger than an i-th thumbnail 331-*i* and may be smaller or larger than or as large as its original image.

The display controller 131 displays the i-th intermediate image 431-*i* within the second display area 412 in response to the selection of the i-th thumbnails 331-*i* within the first display area 411. This selection may be made by the user through an operation performed on the first display area 411 or the second display area 412.

In the example of FIG. 4, the display controller 131 differently controls the display states of i-th page number images 341-*i*; however, the display controller 131 may uniformly control the display states of the i-th page number images 341-*i* or does not necessarily have to display the i-th page number images 341-*i*.

When receiving a user's predetermined operation of the mobile terminal device 12, the display controller 131 changes an intermediate image displayed within the second display area 412. When detecting a user's swipe operation on an intermediate image displayed within the second display area 412, the display controller 131 displays an intermediate image for another page within the second display area 412. More specifically, when a user's finger or pen slides over the intermediate image in the direction from +X-side to the −X-side, the display controller 131 may display the intermediate image for the next page within the second display area 412. When the user's finger or pen slides in the opposite direction, the display controller 131 may display the intermediate image for the previous page within the second display area 412.

When detecting that the user has touched one of the thumbnails 331-8 to 331-14 arranged within the first display area 411 except for the thumbnail 431-11 that has been currently selected, the display controller 131 determines that the user has selected another thumbnail and then displays the intermediate image related to the selected thumbnail within the second display area 412.

As illustrated in FIG. 4, the display controller 131 displays a predetermined icon group including a first rotated icon 511, a second rotated icon 512, and a delete icon 513. When detecting that the user operates any icon in the icon group as by tapping it, the display controller 131 receives the instruction according to this operation. Optionally, the display controller 131 displays one or more icons within the first display area 411, within the second display area 412, or within both the first display area 411 and the second display area 412. Alternatively, when detecting that the user has operated the display unit 112 as by tapping a predetermined portion of the display unit 112 with his/her finger, the display controller 131 may display a predetermined menu on the screen. Then, when detecting that the user selects any item in the menu as by tapping a predetermined portion of the menu, the display controller 131 receives the instruction according to this selection.

The display controller 131 displays a plurality of thumbnails within the first display area 411 on the display surface of the display unit 112 by mapping a 3D original image in the display coordinate system. In addition, the display controller 131 displays a 2D image of the image surface of the original image, as an intermediate image, on the display surface of the display unit 112. The image surface of the original image refers to the surface of the original image as seen from the front.

The display controller 131 can receive an instruction of rotating an i-th thumbnail 331-*i* around an axis different from any axis in the display surface of the display unit 112, through a user's operation. When receiving this instruction, the display controller 131 rotates the i-th thumbnail 331-*i* around a predetermined imaginary axis and then displays the rotated i-th thumbnail 331-*i* within the first display area 411. This imaginary axis is not vertical to the display surface of the display unit 112 but is vertical to the display surface of the i-th thumbnail 331-*i* to be rotated which is displayed in the 3D fashion.

The display unit 112 displays the first rotated icon 511, the second rotated icon 512, and the delete icon 513 within the second display area 412. The first rotated icon 511 is used to receive an instruction of rotating an intermediate image and all thumbnails. Whenever the user taps the first rotated icon 511, the display controller 131 rotates the intermediate image and all the thumbnails by 90°. The second rotated icon 512 is used to receive an instruction of rotating an i-th intermediate image 431-*i* and its relevant i-th thumbnail 331-*i*. Whenever the user taps the second rotated icon 512, the display controller 131 rotates both the i-th intermediate image 431-*i* and the relevant i-th thumbnail 331-*i* by 90°.

Instead of the above icons, the display controller 131 may display one or more menus such as a popup menu to receive a rotation instruction. In this case, the display controller 131 may display a menu by which the user can select all thumbnails or only one i-th thumbnail 331-*i* and then may display another menu by which the user can select a rotation angle such as 90° or 180°.

Figure 5:
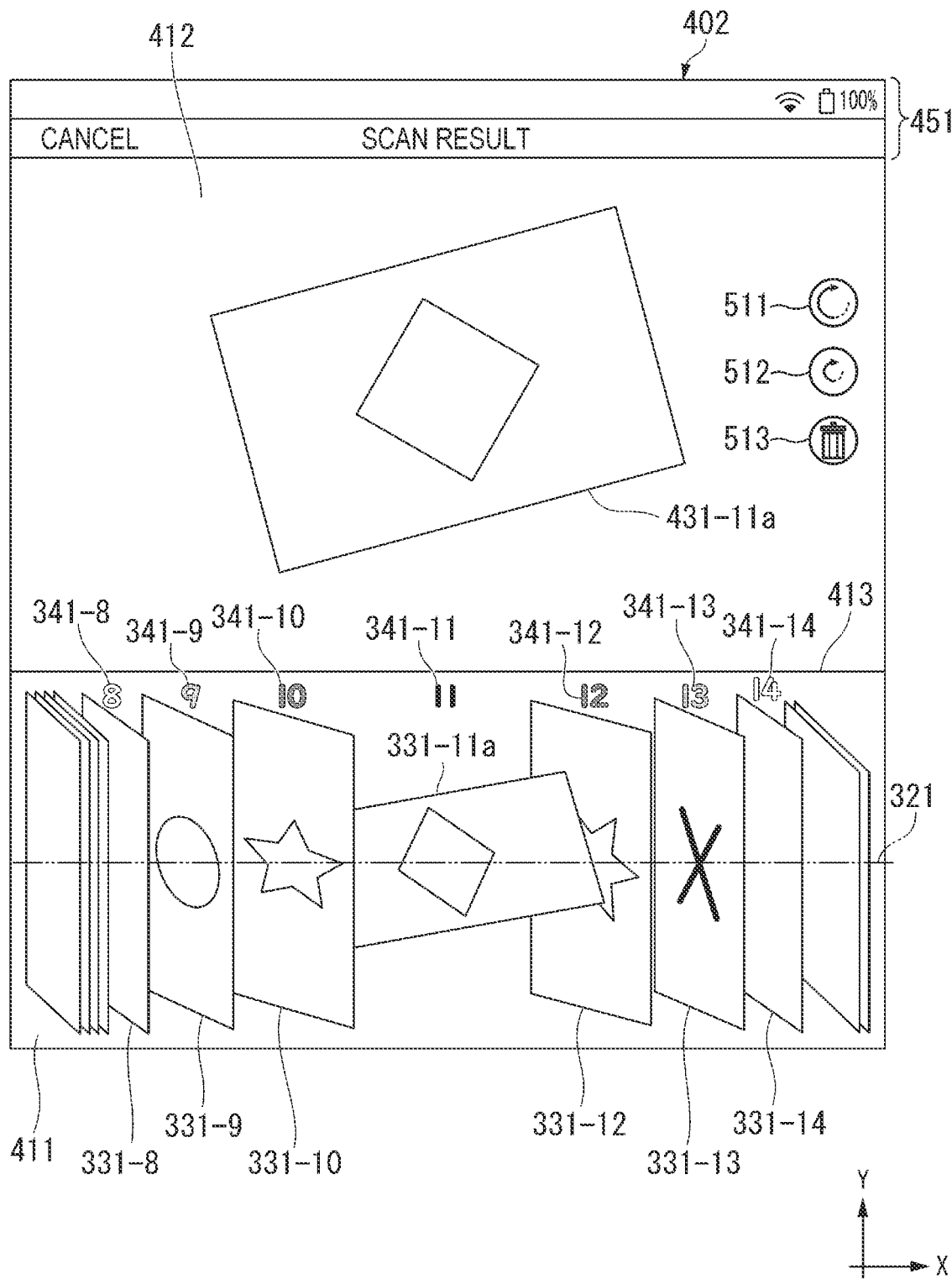
FIG. 5 illustrates an example of a second display image.
Figure 6:
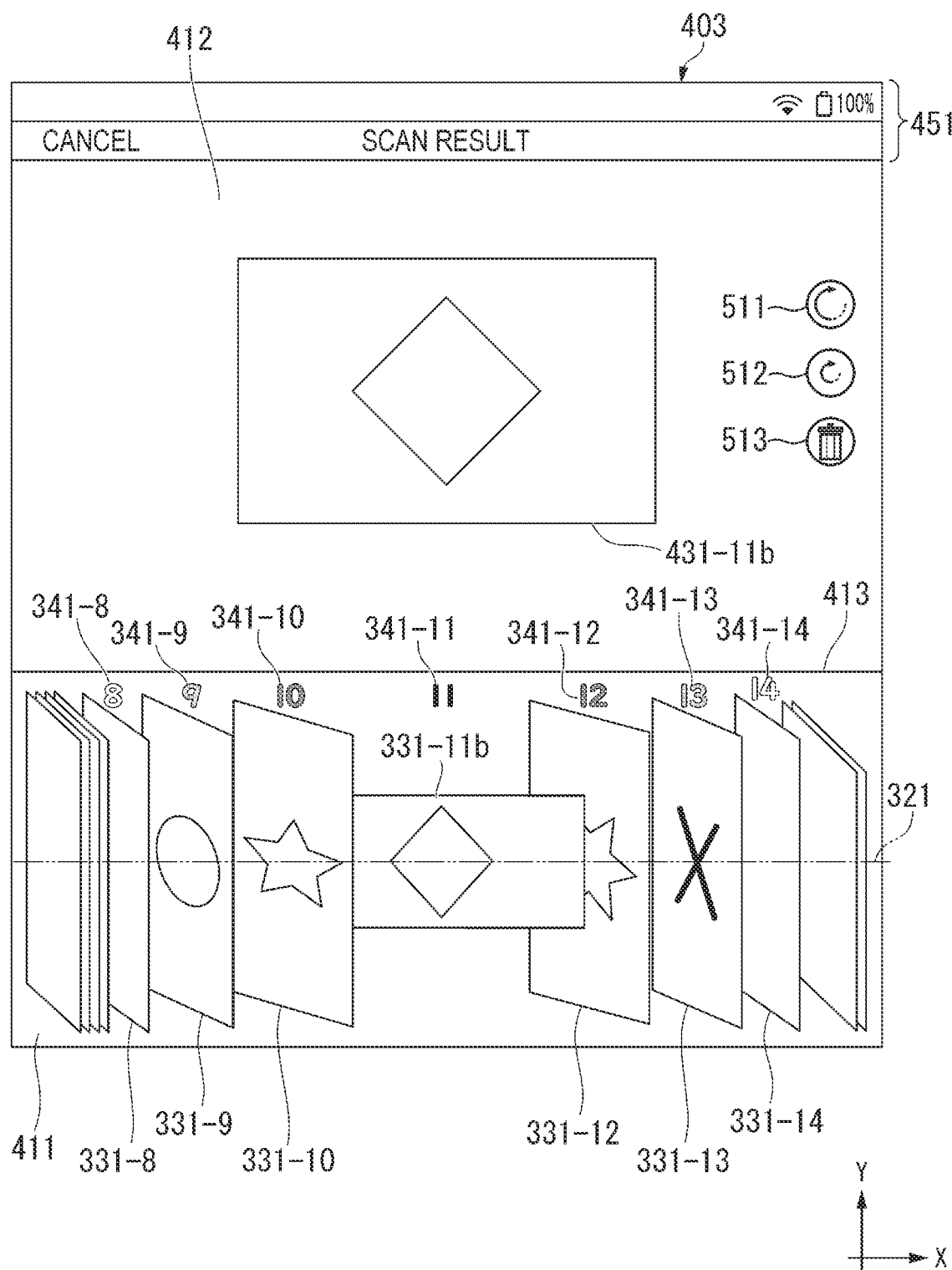
FIG. 6 illustrates an example of a third display image.

FIGS. 5 and 6 each illustrate an example in which both of the 11th thumbnail 331-11 and the 11-th intermediate image 431-11 in FIG. 4 are being rotated 90°. In this example, the display controller 131 receives user's operations of selecting the 11th thumbnail 331-11 and clicking the second rotated icon 512.

FIG. 5 illustrates an example of a second display image 402 that contains, within the first display area 411, an 11a-th thumbnail 331-11*a*, which is a result of rotating the 11th thumbnail 331-11 in FIG. 4 by less than 90°. In this case, the 11a-th thumbnail 331-11*a* corresponds to an example of a thumbnail created by rotating the 11th thumbnail 331-11. Also, the second display image 402 contains, within the second display area 412, an 11a-th intermediate image 431-11*a*, which is a result of rotating the 11-th intermediate image 431-11 in FIG. 4 by the same angle as the 11a-th thumbnail 331-11*a*. In this case, the 11a-th intermediate image 431-11*a* corresponds to an example of an intermediate image created by rotating the 11-th intermediate image 431-11.

FIG. 6 illustrates an example of a third display image 403 that contains, within the first display area 411, an 11b-th thumbnail 331-11*b*, which is a result of rotating the 11a-th thumbnail 331-11*a* in FIG. 5 by total 90°. In this case, the 11b-th thumbnail 331-11*b* corresponds to an example of a thumbnail created by rotating the 11th thumbnail 331-11. Also, the second display image 402 contains, within the second display area 412, an 11b-th intermediate image 431-11*b*, which is a result of rotating the 11b-th intermediate image 431-11*b* in FIG. 5 by total 90°. In this case, the 11b-th intermediate image 431-11*b* corresponds to an example of a rotated, enlarged image created by rotating the 11-th intermediate image 431-11.

When displaying the first display image 401 in FIG. 4, the second display image 402 in FIG. 5, and the third display image 403 in FIG. 6 in this order, the display controller 131 rotates the 11th thumbnail 331-11 within the first display area 411 and the 11-th intermediate image 431-11 within the second display area 412 in conjunction with each other.

To rotate the 11th thumbnail 331-11 within the first display area 411 and the 11-th intermediate image 431-11 within the second display area 412, the display controller 131 employs different methods.

Figure 7:
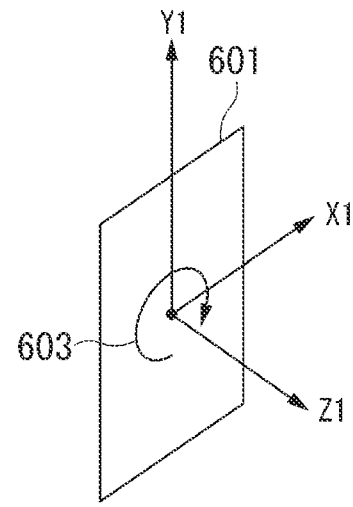
FIG. 7 illustrates an example of an image being rotated in the local coordinate system.
Figure 8:
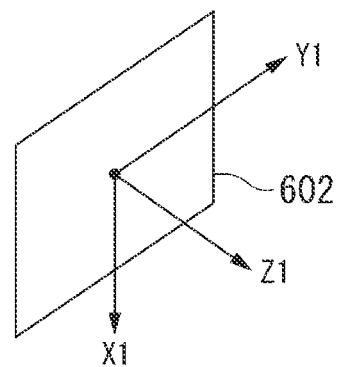
FIG. 8 illustrates an example of an image being rotated in the local coordinate system.

With reference to FIGS. 7 and 8, a description will be given of a method of rotating a thumbnail within the first display area 411. FIGS. 7 and 8 each illustrate a method, according to an embodiment of the present disclosure, of rotating an image in the local coordinate system having an X1-, Y1-, and Z1-axes. Further, FIG. 7 illustrates a first target image 601, which is an example of a thumbnail that has not been rotated; FIG. 8 illustrates a second target image 602, which is an example of the thumbnail that has been rotated. In FIG. 7, a first rotation direction 603 indicates a conceptional direction in which the first target image 601 is to be rotated. In FIG. 8, the second target image 602 is created by rotating the first target image 601 by 90°.

The first target image 601 and the second target image 602 represent the same image. As illustrated in FIGS. 7 and 8, the display controller 131 rotates the first target image 601 around the Z1-axis, which is normal to the image surface of the first target image 601 in the local coordinate system and which passes through the center of the image surface. This normal line corresponds to an imaginary axis passing through the center of a page in the local coordinate system. The normal line may be a normal vector having a direction and a magnitude. In this case, the rotation axis, or the imaginary axis, may contain tolerances of ±5° or so with respect to the normal line. After having rotated the first target image 601, the display controller 131 maps the second target image 602 in the display coordinate system, thereby displaying the second target image 602 within the first display area 411 as a thumbnail.

Figure 9:
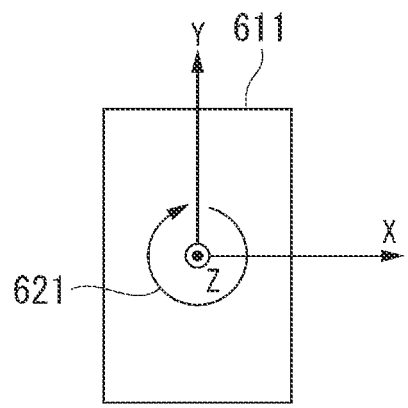
FIG. 9 illustrates an example of an image being rotated in a display coordinate system.
Figure 10:
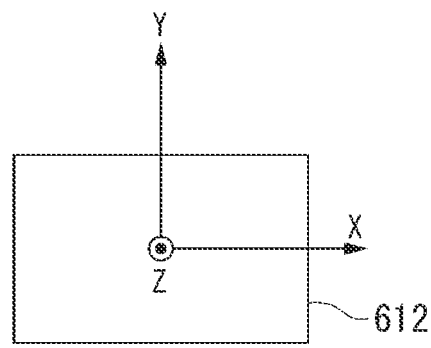
FIG. 10 illustrates an example of an image being rotated in the display coordinate system.

With reference to FIGS. 9 and 10, a description will be given of a method of rotating an intermediate image within the second display area 412. FIGS. 9 and 10 each illustrate a method, according to an embodiment of the present disclosure, of rotating an intermediate image in the display coordinate system having an X- and Y-axes. In this display coordinate system, the Z-axis is normal to the display surface of a third target image 611 and passes through the center of this display surface. Further, FIG. 9 illustrates the third target image 611, which is an example of an intermediate image that has not been rotated; FIG. 10 illustrates a fourth target image 612, which is an example of the intermediate image that has been rotated. In FIG. 9, a second rotation direction 621 indicates a conceptional direction in which the third target image 611 is to be rotated. FIGS. 9 and 10 illustrate 90° rotation.

The third target image 611 and the fourth target image 612 represent the same intermediate image. As illustrated in FIGS. 9 and 10, the display controller 131 rotates the third target image 611 around the Z-axis, which is a normal line corresponding to an imaginary axis extending from the center of a page in the display coordinate system. The normal line may be a normal vector having a direction and a magnitude. In this case, the rotation axis, or the imaginary axis, may contain tolerances of ±5° or so with respect to the normal line. After having rotated the third target image 611, the display controller 131 displays the fourth target image 612 within the second display area 412 as the intermediate image.

The display controller 131 may employ an animation to display the rotation of a thumbnail within the first display area 411. Likewise, the display controller 131 may employ an animation to display the rotation of an intermediate image within the second display area 412. Each of these animations includes a plurality of frame images to be sequentially played at predetermined regular time intervals. In this case, the display controller 131 may display the rotations of the thumbnail and the intermediate image frame by frame.

Figure 11:
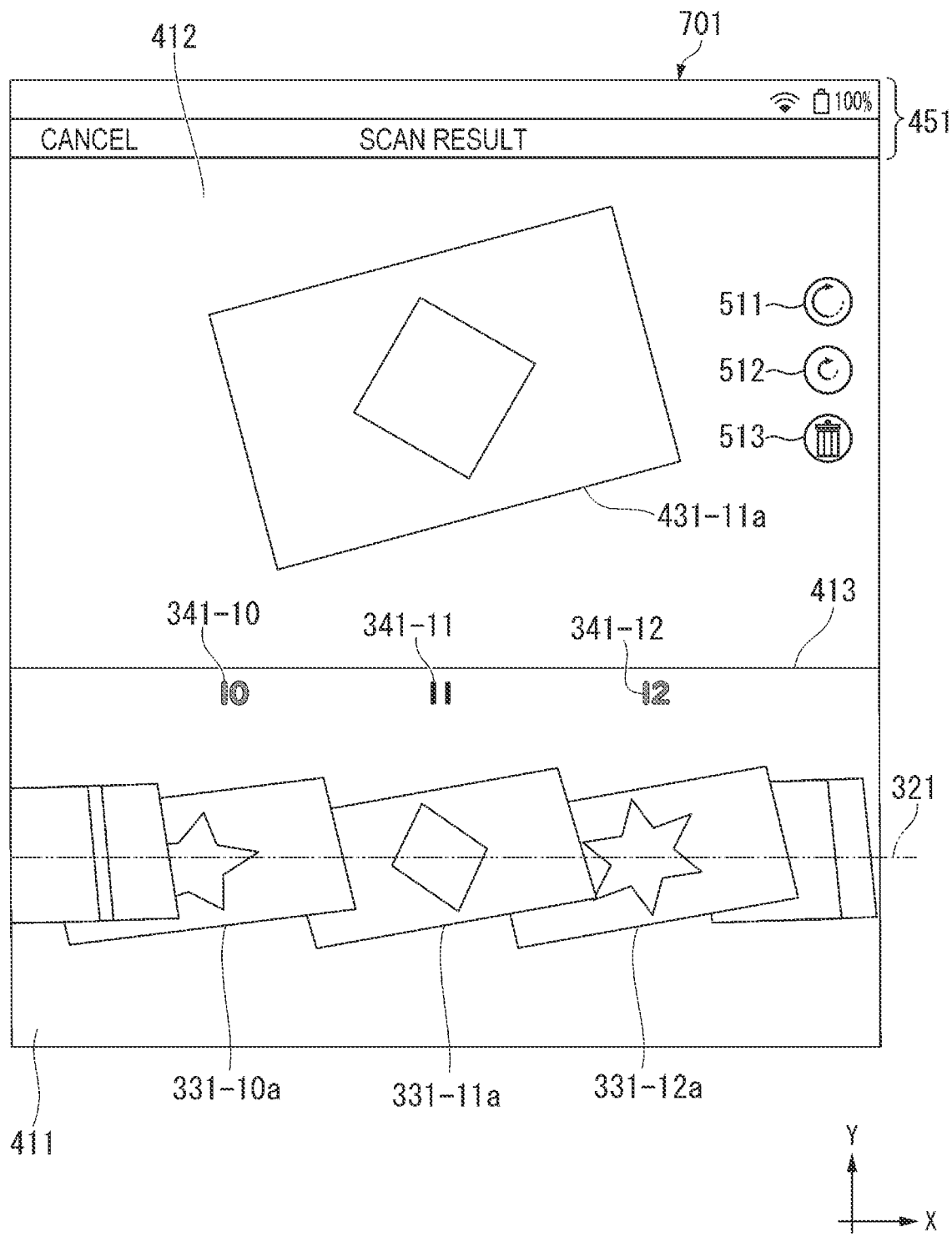
FIG. 11 illustrates an example of a fourth display image.
Figure 12:
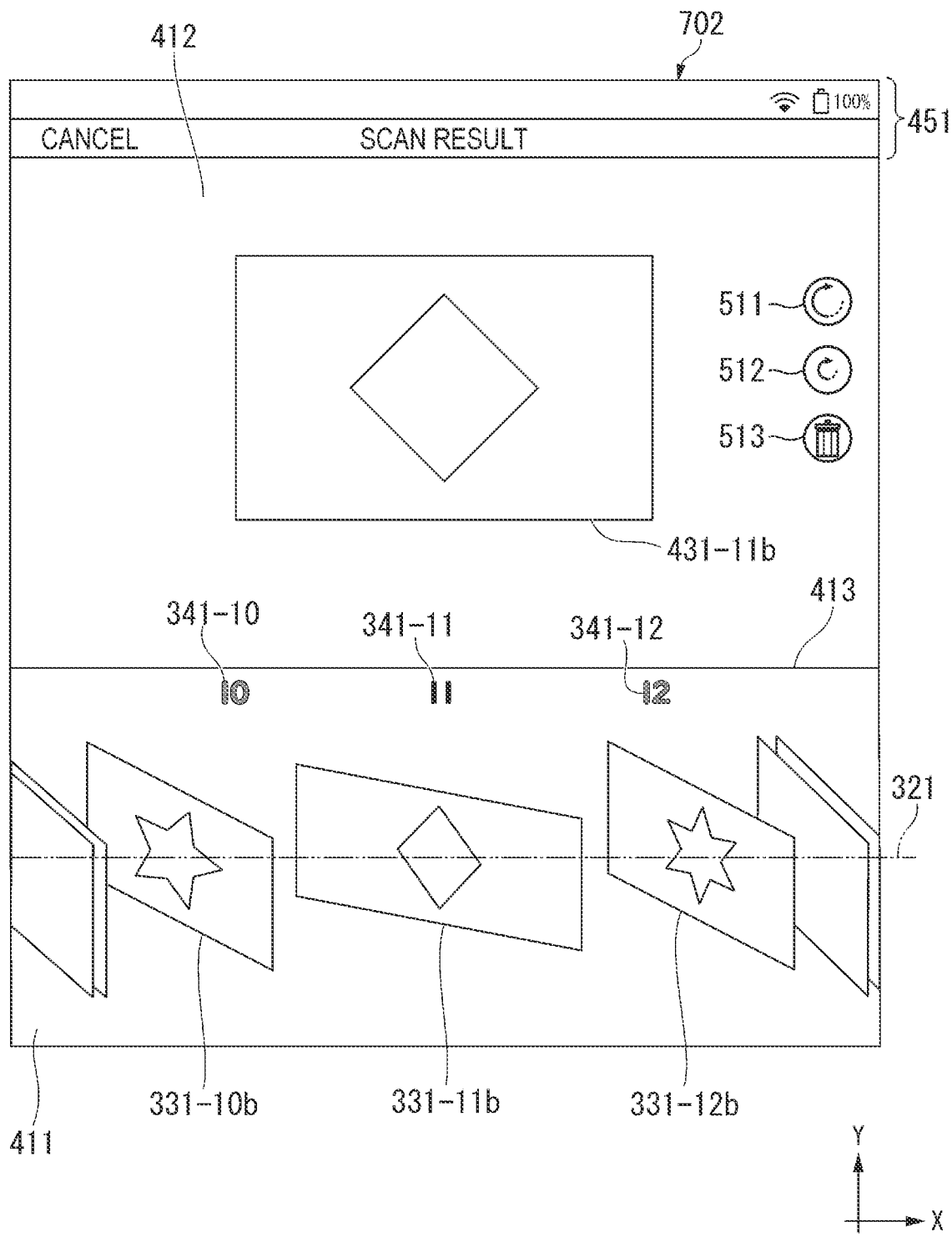
FIG. 12 illustrates an example of a fifth display image.

FIGS. 11 and 12 each illustrate an example in which all the thumbnails and the 11-th intermediate image 431-11 in the first display image 401 in FIG. 4 have been rotated 90°. The display controller 131 receives a user's operation of clicking the first rotated icon 511.

FIG. 11 illustrates an example of a fourth display image 701 according to this embodiment. As illustrated in FIG. 11, the fourth display image 701 contains a plurality of thumbnails, including a 10a-th thumbnail 331-10*a*, an 11a-th thumbnail 331-11*a*, and a 12a-th thumbnail 331-12*a*, within the first display area 411; those thumbnails are created by rotating all the thumbnails in FIG. 4 by less than 90°. Also, the fourth display image 701 contains the 11a-th intermediate image 431-11*a* within the second display area 412; the 11a-th intermediate image 431-11*a* is created by rotating the 11-th intermediate image 431-11 in FIG. 4 by the same angle as the 11a-th thumbnails 331-11*a*.

FIG. 12 illustrates an example of a fifth display image 702. As illustrated in FIG. 12, the fifth display image 702 contains a plurality of thumbnails, including a 10b-th thumbnail 331-10*b*, an 11b-th thumbnail 331-11*b*, and a 12b-th thumbnail 331-12*b*, within the first display area 411; those thumbnails are created by further rotating the thumbnails in FIG. 11 by total 90°. Also, the fifth display image 702 contains the 11a-th intermediate image 431-11*b* within the second display area 412; the 11a-th intermediate image 431-11*b* is created by further rotating the 11a-th intermediate image 431-11*a* in FIG. 11 by total 90°.

If one of the thumbnails differs in orientation from the remaining thumbnails within the first display area 411 in FIG. 11 or 12, the display controller 131 still rotates all the thumbnails together. In this case, the one thumbnail also differs in orientation from the remaining thumbnails during the rotation. The reason why the one thumbnail differs in orientation from the remaining thumbnails is that the one thumbnail has ever been rotated by a different angle from that of the remaining thumbnails.

When displaying the first display image 401 in FIG. 4, the fourth display image 701 in FIG. 11, and the fifth display image 702 in FIG. 12 in this order, the display controller 131 rotates the 11th thumbnail 331-11 within the first display area 411, the 11-th intermediate image 431-11 within the second display area 412, and the remaining thumbnails within the first display area 411 in conjunction with one another.

As described with reference to FIGS. 4 to 12, the mobile terminal device 12 displays a plurality of thumbnails each having an image surface in a 3D fashion on the display surface of the display unit 112. In response to a reception of an instruction of rotating the thumbnails around axes different from any axis in the display surface, the mobile terminal device 12 rotates the thumbnails around respective imaginary axes; the imaginary axes form different angles with an axis vertical to the display surface and are vertical to the respective image surfaces. Then, the mobile terminal device 12 displays the rotated thumbnails.

The mobile terminal device 12 may also display an intermediate image having a display surface which is created by displaying, in a 2D fashion, an original image related to the thumbnail displayed in the 3D fashion. In response to a reception of an instruction of rotating the intermediate image around an axis vertical to the display surface, the mobile terminal device 12 rotates the intermediate image around the axis vertical to the display surface and then displays the rotated intermediate image. When receiving one of a first instruction of rotating an i-th thumbnail 331-$i$ within the first display area 411 and a second instruction of rotating an i-th intermediate image 431-$i$ related to the i-th thumbnail 331-$i$ within the second display area 412, the mobile terminal device 12 may determine that it has received both of the first and second instructions. However, the mobile terminal device 12 may receive the first and second instructions separately.

The mobile terminal device 12 may display the rotation of an i-th thumbnail 331-$i$ within the first display area 411 and the rotation of an i-th intermediate image 431-$i$ related to the i-th thumbnail 331-$i$ within the second display area 412 in conjunction with each other.

The mobile terminal device 12 may display a plurality of thumbnails with their imaginary axes forming different angles with the axis vertical to the display surface.

The mobile terminal device 12 may display the rotations of the plurality of thumbnails within the first display area 411 in conjunction with one another.

The mobile terminal device 12 may display the rotations with an animation.

Next, with reference to FIGS. 13 to 15, a description will be given below of a method of adjusting the distances between adjacent thumbnails displayed within the first display area 411. The display controller 131 adjusts the distances between adjacent thumbnails out of a plurality of thumbnails displayed within the first display area 411, based on their rotation angles and aspect ratios.

Figure 13:
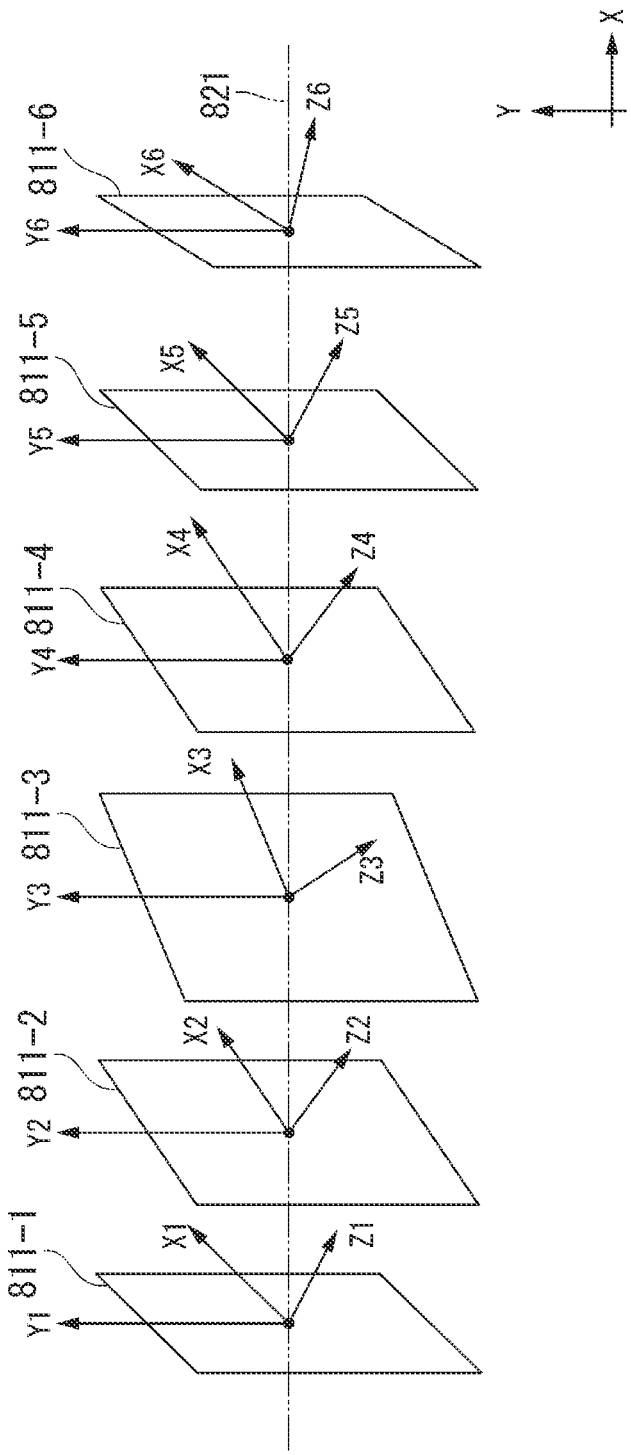
FIG. 13 illustrates an example of the rotations of a plurality of displayed images.

FIG. 13 illustrates an example of rotations of a plurality of display images: a 1st image 811-1 to a 6th image 811-6. In other words, FIG. 13 illustrates six j-th image 811-$j$ in respective local coordinate systems having an Xj-, Yj-, and Zj-axes, where J is an integer ranging from 1 to 6. In FIG. 13, the 1st image 811-1 to the 6th image 811-6 are arranged side by side along a second axis 821, which is an imaginary axis, similar to the first axis 321 illustrated in FIG. 4. All of the j-th images 811-$j$ are rotated relative to the respective local coordinate systems. FIG. 13 illustrates the display coordinate systems in which the j-th images 811-$j$ are mapped in a 2D fashion.

Figure 14:
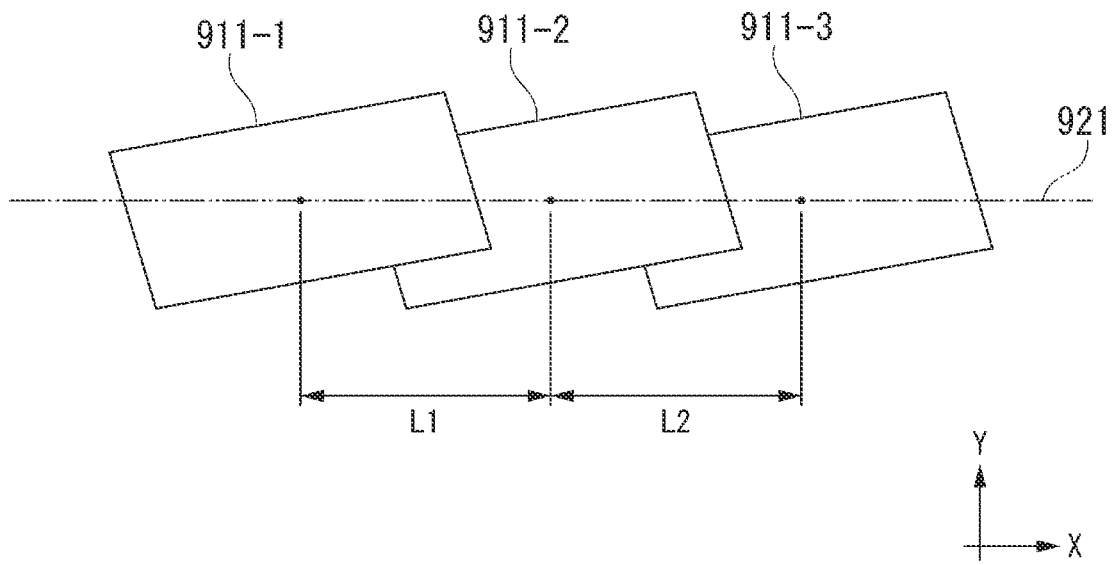
FIG. 14 illustrates a method of adjusting the distances between adjacent display images.
Figure 15:
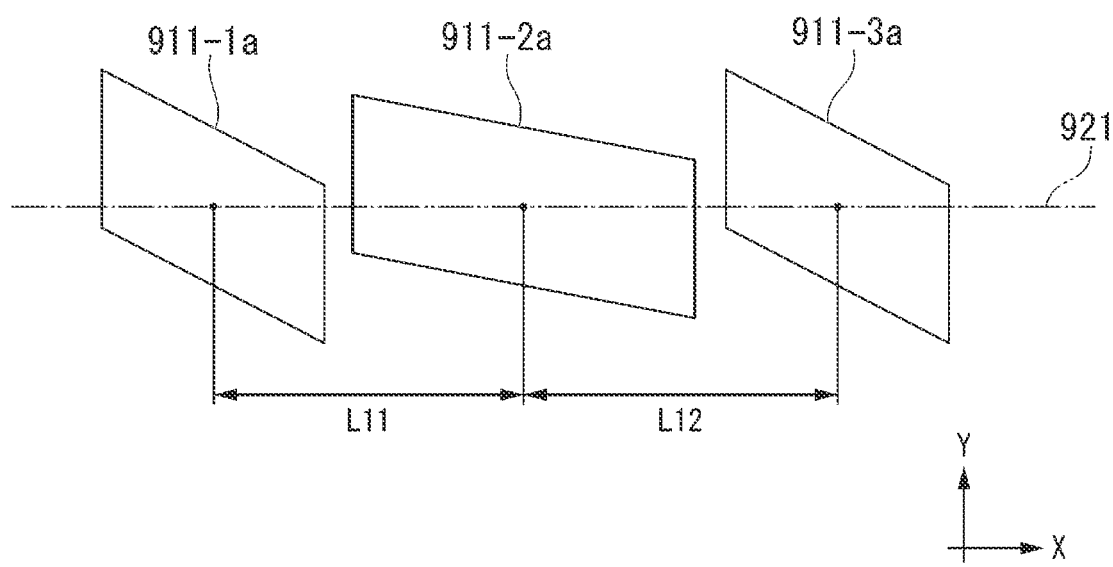
FIG. 15 illustrates a method of adjusting the distances between adjacent display images.

FIGS. 14 and 15 each illustrate a method, according to an embodiment, of adjusting the distances between adjacent display images. In FIGS. 14 and 15, the display coordinate system is set for each display image. In FIG. 14, a 1st display image 911-1 to a 3rd display image 911-3 are an example of a plurality of thumbnails arranged side by side within the first display area 411; the distances between the 1st display image 911-1 and the 2nd display image 911-2 and between the 2nd display image 911-2 and the 3rd display image 911-3 have not yet been adjusted. In this example, the 2nd display image 911-2 overlaps both the 1st display image 911-1 and 3rd display image 911-3 disposed adjacent thereto.

The display controller 131 increases the distances between the 1st display image 911-1 and the 2nd display image 911-2 and between the 2nd display image 911-2 and the 3rd display image 911-3 until both the 1st display image 911-1 and the 3rd display image 911-3 become separated from the 2nd display image 911-2.

In FIG. 15, a 1a-th display image 911-1$a$ to a 3a-th display image 911-3$a$ are an example of a plurality of thumbnails arranged side by side within the first display area 411; the distances between the 1a-th display image 911-1$a$ and the 2a-th display image 911-2$a$ and between the 2a-th display image 911-2$a$ and the 3a-th display image 911-3$a$ have already been adjusted in the above manner. It should be noted that the 1a-th display image 911-1$a$ to the 3a-th display image 911-3$a$ illustrated in FIG. 15 correspond, respectively, to the 1st display image 911-1 to the 3rd display image 911-3 illustrated in FIG. 14.

As illustrated in FIG. 15, the display controller 131 sets a distance L11 between the 1a-th display image 911-1$a$ and the 2a-th display image 911-2$a$ to be longer than a distance L1 between the 1st display image 911-1 and the 2nd display image 911-2 illustrated in FIG. 14. Likewise, the display controller 131 sets a distance L12 between the 2a-th display image 911-2$a$ and the 3a-th display image 911-3$a$ to be longer than a distance L2 between the 2nd display image 911-2 and the 3rd display image 911-3 illustrated in FIG. 14. The distances between adjacent display images are defined as the distances between the centers of the adjacent display images on a third axis 921, which is an imaginary axis similar to the first axis 321 illustrated in FIG. 4.

In this embodiment, the display controller 131 adjusts the distances between adjacent thumbnails by separating the thumbnails from one another. Alternatively, the display controller 131 may adjust the distances between adjacent thumbnails by reducing the overlap therebetween.

While rotating a plurality of thumbnails by predetermined angles, the display controller 131 adjusts the distances between adjacent thumbnails out of the thumbnails. In the first display image 401 of FIG. 4, the display controller 131 may adjust the distances in such a way that thumbnails positioned closer to the center of the first display area 411 along the first axis 321 are farther from each other. In other words, the display controller 131 may adjust the distances in such a way that thumbnails positioned farther from the center of the first display area 411 along the first axis 321 are closer to each other. Alternatively, in the first display image 401 of FIG. 4, the display controller 131 may adjust the distances in such a way that thumbnails having larger sizes along the first axis 321 are farther from each other. In other words, the display controller 131 may adjust the distances in such a way that thumbnails having smaller sizes along the first axis 321 are closer to each other. Herein, the distances may also be referred to as the intervals.

As described with reference to FIGS. 13 to 15, the terminal device 12 displays the rotations of a plurality of thumbnails while adjusting the distances between adjacent thumbnails out of the thumbnails based on their rotation angles and aspect ratios. In this case, the display unit 112 may adjust the distance between an adjacent pair of thumbnails, based on the aspect ratio of one of the thumbnails or based on the aspect ratios of both of the thumbnails.

In the information processing system 1 according to this embodiment, the mobile terminal device 12 displays a thumbnail having an image surface on the display surface in a 3D fashion. In response to a reception of an instruction of rotating the thumbnail around an axis different from any axis in the display surface, the mobile terminal device 12 rotates this thumbnail around an axis vertical to the image surface and then displays the rotated thumbnail. In this way, the mobile terminal device 12 clearly displays a thumbnail in a 3D fashion in response to a reception of an instruction of rotating the thumbnail. More specifically, the mobile terminal device 12 clearly displays a thumbnail in a 3D fashion, especially when receiving an instruction of rotating the thumbnail around an axis different from any axis in the display surface.

The mobile terminal device 12 displays a plurality of thumbnails each having an image surface in a 3D fashion on the display surface. In this case, when receiving an instruction of rotating the thumbnails around axes different from any axis in the display surface, the mobile terminal device 12 individually rotates the thumbnails around rotation axes corresponding to normal vectors in the respective local coordinate systems. Then, the mobile terminal device 12 displays the rotated thumbnails. Simultaneously, the mobile terminal device 12 adjusts the intervals between pages, based on the aspect ratios of the rotated thumbnails. In this case, the mobile terminal device 12 may gradually change the intervals between the pages in accordance with the progress of the rotation.

Conventional image display apparatuses can clearly display the rotation of a 2D image around an axis vertical to its display surface, whereas they may distort a 3D image when rotating it on the display surface.

The mobile terminal device 12, however, can clearly display the rotation of a thumbnail on its display surface in such a way that a user can visually perceive the geometry of the thumbnail as being natural. The mobile terminal device 12 may adjust the distance between the rotated thumbnail and its adjacent thumbnail in accordance with the overlap therebetween. In this way, the mobile terminal device 12 suppresses a thumbnail for a page from largely overlapping a thumbnail for another page, so that the user can clearly view the thumbnails. In this case, the mobile terminal device 12 may display an animation of the rotation of the thumbnail, so that the user can visually perceive the progress of the rotation.

In the above embodiment, the image processing apparatus 11 has a scanner function; however, the image processing apparatus 11 may have any other function. The image processing apparatus 11 may have a print function instead of the scanner function. In this case, the print operation of the image processing apparatus 11 may be controlled by the mobile terminal device 12. The image processing apparatus 11 may transmit data on an image to be printed, so that the user can view the image through the display unit 112. Alternatively, the image processing apparatus 11 may have a plurality of functions: scanner and print functions, in which case the image processing apparatus 11 acts as a multifunction product (MFP).

In the above embodiment, the mobile terminal device 12 is implemented by a mobile terminal device; however, the mobile terminal device 12 may be implemented by a stationary terminal device. In short, the mobile terminal device 12 may be implemented by any apparatus with a display screen. The mobile terminal device 12 may be called a viewer.

The image processing apparatus 11 may be a server that transmits image data from a database to the mobile terminal device 12. In this case, the image data may be electronic book (e-book) data.

In the mobile terminal device 12, the display unit 112 may have two display areas: the first display area 411 and the second display area 412. Alternatively, the display unit 112 may have any other number of display areas. If the mobile terminal device 12 has a plurality of display areas, these display areas may be arranged arbitrarily. For example, the display areas are arrayed horizontally or vertically when the mobile terminal device 12 is viewed from the front. In the mobile terminal device 12, the first display area 411 and the second display area 412 may be arranged in the order reverse to that of FIG. 4.

In the above embodiment, the mobile terminal device 12 displays a single intermediate image within the second display area 412; however, the mobile terminal device 12 may display two or more intermediate images thereon.

The image processing apparatus 11 may perform display controls that are the same as those performed by the display controller 131 in the mobile terminal device 12. In this case, the image processing apparatus 11 may control a control panel provided therein or an external display unit such as a remote display unit.

The display controller 131 generates display data in a local coordinate system, a global coordinate system, or a display coordinate system; however, the display controller 131 may generate the display data with any other method.

Some configuration examples of the embodiment will be described below. A mobile terminal device 12 in an information processing system 1 according to an embodiment of the present disclosure performs an image display method that will be described below.

The above image display method includes: displaying a first image having a first image surface on a display surface in a three-dimensional fashion; in response to a reception of an instruction of rotating the first image around an axis different from any axis in the display surface, rotating the first image around a first imaginary axis, the first imaginary axis being vertical to the first image surface and different from an axis vertical to the display surface; and displaying the rotated first image.

As illustrated in FIG. 4, a display controller 131 displays an 11th thumbnail 331-11 on a display surface of a display unit 112. Herein, the 11th thumbnail 331-11 corresponds to an example of the first image; an image surface of the 11th thumbnail 331-11 corresponds to an example of the first image surface. In addition, the 11a-th thumbnail 331-11*a* in FIG. 5 and an 11b-th thumbnail 331-11*b* in FIG. 6, both of which are created by rotating the thumbnail 331-11, corresponds to examples of the rotated first image. A Z1-axis around which a first target image 601 is rotated as illustrated in FIG. 7 and a Z1-axis around which a second target image 602 is rotated as illustrated in FIG. 7 correspond to examples of the first imaginary axis. The plane surface, or the image surface, of the first target image 601 in FIG. 7 and the image surface of the second target image 602 in FIG. 8 correspond to examples of the first image surface.

The above image display method may further include: displaying, in a two-dimensional fashion, an enlarged image related to the first image displayed in the three-dimensional fashion; in response to the reception of the instruction, rotating the enlarged image around the axis vertical to the display surface; and displaying the rotated, enlarged image.

Herein, an intermediate image 431-11 in FIG. 4, an 11a-th intermediate image 431-11*a* 1 in FIG. 5, and an 11b-th intermediate image 431-11*b* in FIG. 6 correspond to examples of the rotated, enlarged image. FIGS. 9 and 10 each illustrate an example of the rotation of an enlarged image. However, the enlarged image may be rotated in another aspect.

In the above image display method, the first image and the enlarged image may be rotated in conjunction with each other in response to the reception of the instruction.

As illustrated in FIGS. 4 to 6, the first image (11th thumbnail 331-11, 11a-th thumbnail 331-11*a*, and 11b-th thumbnail 331-11*b*) and the enlarged image (11-th intermediate image 431-11, 11a-th intermediate image 431-11*a*, and 11b-th intermediate image 431-11*b*) are rotated in conjunction with each other. However, the first image and the enlarged image do not necessarily have to be rotated in conjunction with each other.

The above image display method may further include: displaying a second image having a second image surface on the display surface in the three-dimensional fashion; in response to the reception of the instruction, rotating the second image around a second imaginary axis, the second imaginary axis being vertical to the second image surface and different from the axis vertical to the display surface; and displaying the rotated second image.

Herein, thumbnails other than the 11th thumbnail 331-11 in FIGS. 4, 11, and 12 correspond to examples of the second image; the image surfaces of these thumbnails correspond to examples of the second image surface. In addition, the thumbnails other than the 11a-th thumbnail 331-11*a* in FIG. 11 and the 11b-th thumbnail 331-11*b* in FIG. 12 are examples of the rotated second image. The second imaginary axis for the second image is set for each original image, similar to the first imaginary axis for the first image. However, the second image may be rotated in another aspect.

In the above image display method, the first imaginary axis and the second imaginary axis may form different angles with the axis vertical to the display surface.

As illustrated in FIG. 13, the 1st image 811-1 to the 6th image 811-6 form different angles with the axis vertical to the display surface. However, the first imaginary axis and the second imaginary axis may be axes in another aspect.

In the above image display method, the second image may be adjacent to the first image. The image display method may further include, upon displaying of the rotated first image and the rotated second image, changing a distance between the rotated first image and the rotated second image, based on rotation angles of the first image and the second image and an aspect ratio of the first image.

FIGS. 14 and 15 illustrate an example of a method of changing the above distance. However, the distance between the first image and the second image may be changed in another aspect or does not necessarily have to be changed.

In the above image display method, the first image and the second image may be rotated in conjunction with each other in response to the reception of the instruction.

As illustrated in FIGS. 4, 11, and 12, the first image (11th thumbnails 331-11, 331-11*a*, and 331-11*b*) and the second image (thumbnail 331-10 or 331-12, 331-10*a* or 331-12*a*, and 331-10*b* or 331-12*b*) may be rotated in conjunction with each other.

The above image display method may further include displaying a rotation of the first image with an animation during the rotation of the first image.

The images in FIGS. 4 to 6 may be displayed in the form of an animation. The images of FIGS. 4, 11, and 12 may be displayed in the form of an animation. However, the rotation of an image does not necessarily have to be displayed in the form of an animation.

The present disclosure may also provide an image display apparatus that performs the above image display method.

The above image display apparatus includes: a display unit having a display surface; a display controller that displays a first image having a first image surface on the display surface in a three-dimensional fashion; and an input unit that receives an instruction of rotating the first image around an axis different from any axis in the display surface. In response to a reception of the instruction from the input unit, the display controller rotates the first image around a first imaginary axis and displays the rotated first image, the first imaginary axis being vertical to the first image surface and different from an axis vertical to the display surface.

Herein, a mobile terminal device 12 in FIG. 2 which includes a display unit 112, an input unit 111, and a display controller 131 corresponds to the image display apparatus.

The present disclosure may also provide a non-transitory computer-readable storage medium that stores a display control program for causing a computer to perform the image display method.

The non-transitory computer-readable storage medium stores the display control program. This display control program causes a computer to perform a method that includes: displaying a first image having a first image surface on a display surface in a three-dimensional fashion; in response to a reception of an instruction of rotating the first image around an axis different from any axis in the display surface, rotating the first image around a first imaginary axis, the first imaginary axis being vertical to the first image surface and different from an axis vertical to the display surface; and displaying the rotated first image.

The mobile terminal device 12 in FIG. 2 is implemented by a computer that executes the above display control program.

The above display control program for realizing any functional unit in a predetermined device, such as the image processing apparatus 11 or the mobile terminal device 12, may be stored in a computer-readable recording medium and then may be read and executed by a computer system. Herein, the computer system may include an operating system (OS) and a hardware device such as a peripheral. The computer-readable recording medium may be a mobile medium or a storage device: examples of the mobile medium include a flexible disk, a magneto-optical disk, read-only memory (ROM), and a compact disc (CD)-ROM; an example of the storage device is a hard disk provided inside the above computer system. The computer-readable recording medium may be a substance that temporarily stores a program. An example of this computer-readable recording medium is volatile memory inside the computer system when the computer system acts as a server/client that transmits or receives a program over a network or a communication line; the network may be the Internet, and the communication line may be a telephone line. The volatile memory may be random-access memory (RAM); the computer-readable recording medium may be a non-temporary recording medium.

The above program may be transmitted from a computer system with a storage device, for example, to another computer system via a transmission medium or a transmitted wave in the transmission medium. Herein, the transmission medium via which the program is transmitted refers to a medium via which information is transmitted; examples of this medium include networks such as the Internet and communication lines such as a telephone line.

The above program may be used to realize some of the above functions. The program may be a differential file, called a differential program, that realizes the above functions in cooperation with another program stored in the computer system.

Any functional unit in a predetermined device, such as the image processing apparatus 11 or the mobile terminal device 12, may be implemented by a processor. Individual processes in the embodiment may be implemented by a processor that operates based on information such as a program and a computer-readable recording medium that stores information such as a program. Functional units in the processor may be implemented by one or more hardware devices. The processor includes a hardware device, which may include one or both of a digital circuit and an analog circuit. The processor may include one or more circuit devices mounted on a circuit board, one or more circuit elements, or a combination thereof; each circuit device may be an integrated circuit (IC), and each circuit element may be a resistor or a capacitor.

The processor may be a central processing unit (CPU), a graphics processing unit (GPU), or a digital signal processor (DSP). Alternatively, the processor may be one or more application-specific integrated circuits (ASICs), a plurality of CPUs, or a combination thereof. Furthermore, the processor may further include an analog amplifier circuit and/or an analog filter circuit.

The present disclosure is not limited to the embodiment that has been described with reference to the accompanying drawings. Obviously, the embodiment may undergo some design modifications without departing from the spirit of the present disclosure.

What is claimed is:

1. An image display method comprising:
   displaying a first image having a first image surface on a display surface in a three-dimensional fashion, the first image being displayed in a first display area, the first display area having a first side and a second side, the first side being a right side corresponding to a positive side of an X-axis and the second side being a left side corresponding to a negative side of the X-axis;
   displaying, in a two-dimensional fashion, an enlarged image related to the first image displayed in the three-dimensional fashion, the enlarged image being displayed in a second display area separated from the first display area by a boundary axis;
   displaying, in the first display area, a plurality of second images each having a second image surface on the display surface in the three-dimensional fashion, each of the first image and the plurality of second images having a local coordinate system with an X-axis, a Y-axis, and a Z-axis, a +Z-side of the Z-axis extending outwardly from, respectively, the first image surface and the second image surface generally towards the first side;
   in response to a reception of an instruction of rotating the first image around an axis different from any axis in the display surface, rotating the first image around a first imaginary axis, the first imaginary axis being vertical to the first image surface and different from an axis vertical to the display surface and rotating the enlarged image around the axis vertical to the display surface in conjunction with rotating the first image in the first display area; and
   displaying the rotated first image and the rotated enlarged image.

2. The image display method according to claim 1, further comprising:
   in response to the reception of the instruction, rotating one of the plurality of the second images around a second imaginary axis, the second imaginary axis being vertical to the second image surface of the one of the plurality of the second images and different from the axis vertical to the display surface; and
   displaying the rotated second image.

3. The image display method according to claim 2, wherein
   the first imaginary axis and the second imaginary axis form different angles with the axis vertical to the display surface.

4. The image display method according to claim 2, wherein
   one of the plurality of the second images is adjacent to the first image, and
   the image display method further comprises, upon displaying of the rotated first image and the rotated one of the plurality of second images, changing a distance between the rotated first image and the rotated one of the plurality of second images, based on rotation angles of the first image and the one of the plurality of second images and an aspect ratio of the first image.

5. The image display method according to claim 2, wherein
   in response to the reception of the instruction, the first image and the plurality of second images are rotated in conjunction with each other.

6. The image display method according to claim 1, further comprising displaying a rotation of the first image with an animation during the rotation of the first image.

7. An image display apparatus comprising:
   a display having a display surface;
   a display controller that displays a first image having a first image surface on the display surface in a three-dimensional fashion in a first display area, displays a plurality of second images each having a second image surface on the display surface in the three-dimensional fashion in the first display area, and displays, in a two-dimensional fashion, an enlarged image related to the first image displayed in the three-dimensional fashion, the enlarged image being displayed in a second display area separated from the first display area by a boundary axis, each of the first image and the plurality of second images having a local coordinate system with an X-axis, a Y-axis, and a Z-axis, a +Z-side of the Z-axis extending outwardly from, respectively, the first image surface and the second image surface generally towards a first side of the display surface, the first side being a right side corresponding to a positive side of an X-axis of the display surface; and
   an input unit that receives an instruction of rotating the first image around an axis different from any axis in the display surface, wherein
   in response to a reception of the instruction from the input unit, the display controller rotates the first image around a first imaginary axis and displays the rotated first image, the first imaginary axis being vertical to the first image surface and different from an axis vertical to the display surface and rotates the enlarged image around the axis vertical to the display surface in conjunction with rotating the first image in the first display area.

8. The image display apparatus according to claim 7, wherein
   in response to the reception of the instruction, the display controller rotates one of the plurality of second images around a second imaginary axis and displays the rotated one of the plurality of second images, the second imaginary axis being vertical to the second image surface of the one of the plurality of the second images and different from the axis vertical to the display surface.

9. A non-transitory computer-readable storage medium that stores a display control program, the display control program causing a computer to perform a method comprising:
- displaying a first image having a first image surface on a display surface in a three-dimensional fashion in a first display area and displaying an enlarged image related to the first image displayed in the three-dimensional fashion in a second display area separated from the first display area by a boundary axis;
- displaying a plurality of second images each having a second image surface on the display surface in the three-dimensional fashion in the first display area, each of the first image and the plurality of second images having a local coordinate system with an X-axis, a Y-axis, and a Z-axis, a +Z-side of the Z-axis extending outwardly from, respectively, the first image surface and the second image surface generally towards a first side of the display surface, the first side being a right side corresponding to a positive side of an X-axis of the display surface;
- in response to a reception of an instruction of rotating the first image around an axis different from any axis in the display surface, rotating the first image around a first imaginary axis, the first imaginary axis being vertical to the first image surface and different from an axis vertical to the display surface and rotating the enlarged image around the axis vertical to the display surface in conjunction with rotating the first image in the first display area; and
- displaying the rotated first image and the rotated enlarged image.

10. The non-transitory computer-readable storage medium according to claim 9 which stores the display control program, the display control program causing the computer to perform the method further comprising:
- in response to the reception of the instruction, rotating one of the plurality of the second images around a second imaginary axis, the second imaginary axis being vertical to the second image surface of the one of the plurality of the second images and different from the axis vertical to the display surface; and
- displaying the rotated second image.

11. The non-transitory computer-readable storage medium according to claim 10, wherein
- the first imaginary axis and the second imaginary axis form different angles with the axis vertical to the display surface.

12. The non-transitory computer-readable storage medium according to claim 10, wherein
- one of the plurality of the second images is adjacent to the first image, and
- the method further comprises, upon displaying of the rotated first image and the rotated one of the plurality of second images, changing a distance between the rotated first image and the rotated one of the plurality of second images, based on rotation angles of the first image and the one of the plurality of second images and an aspect ratio of the first image.

13. The non-transitory computer-readable storage medium according to claim 10, wherein
- in response to the reception of the instruction, the first image and the one of the plurality of second images are rotated in conjunction with each other.

14. The non-transitory computer-readable storage medium according to claim 9 which stores the display control program, the display control program causing the computer to perform the method further comprising displaying a rotation of the first image with an animation during the rotation of the first image.

* * * * *